(12) United States Patent
Chen et al.

(10) Patent No.: US 9,189,351 B2
(45) Date of Patent: Nov. 17, 2015

(54) METHOD OF OBTAINING INSTRUCTION FOR TRIGGERING FUNCTION

(75) Inventors: Nung-Kai Chen, New Taipei (TW); Pei-Chih Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 809 days.

(21) Appl. No.: 13/526,539

(22) Filed: Jun. 19, 2012

(65) Prior Publication Data

US 2013/0232287 A1    Sep. 5, 2013

(30) Foreign Application Priority Data

Mar. 2, 2012  (TW) .............................. 101107034 A

(51) Int. Cl.
*G06F 13/24*    (2006.01)
*G06F 9/00*    (2006.01)
*G06F 9/24*    (2006.01)
*G06F 15/177*    (2006.01)
*G06F 1/24*    (2006.01)
*G06F 11/22*    (2006.01)

(52) U.S. Cl.
CPC .................................. *G06F 11/2284* (2013.01)

(58) Field of Classification Search
CPC ... G06F 9/4401; G06F 9/4405; G06F 9/4812; G06F 9/4403; G06F 9/4406
USPC .......................... 710/260, 261; 713/1, 2, 100
See application file for complete search history.

(56) References Cited

U.S. PATENT DOCUMENTS

| | | | |
|---|---|---|---|
| 7,299,346 B1 * | 11/2007 | Hollis ................................ | 713/2 |
| 7,346,759 B1 * | 3/2008 | Ansari et al. .................... | 712/34 |
| 7,509,511 B1 * | 3/2009 | Barowski et al. ............. | 713/320 |
| 7,747,848 B1 * | 6/2010 | Nallagatla et al. ................ | 713/2 |
| 2003/0204710 A1 | 10/2003 | Culter et al. | |
| 2004/0162976 A1 * | 8/2004 | Yakovlev .......................... | 713/1 |
| 2005/0177710 A1 * | 8/2005 | Rothman et al. .................. | 713/2 |
| 2005/0182916 A1 * | 8/2005 | Kageyama et al. ............. | 712/24 |
| 2005/0286633 A1 * | 12/2005 | Abel et al. ............... | 375/240.16 |

(Continued)

FOREIGN PATENT DOCUMENTS

TW    200422834    11/2004

OTHER PUBLICATIONS

"Office Action of Taiwan Counterpart Application", issued on Jun. 23, 2014, with a partial English translation thereof, p. 1-p. 7.

(Continued)

*Primary Examiner* — Faisal M Zaman
(74) *Attorney, Agent, or Firm* — Jianq Chyun IP Office

(57) ABSTRACT

A method of obtaining a function triggering instruction is provided. The method is adapted to a computer system using a unified extensible firmware interface (UEFI). In the present method, a variable in a read-only memory (ROM) of a basic input/output system (BIOS) is accessed during power-on self test (POST) of the computer system, wherein the variable has a first element, a second element, and a third element. Whether values of the first element and the second element respectively match a variable name and a globally unique identifier (GUID) corresponding to an instruction is determined. If the values of the first element and the second element respectively match the variable name and the GUID corresponding to the instruction, a function triggered by the instruction is executed according to the value of the third element.

11 Claims, 3 Drawing Sheets

(56) References Cited

U.S. PATENT DOCUMENTS

| | | | |
|---|---|---|---|
| 2007/0186085 A1* | 8/2007 | Yim et al. ................ 712/244 |
| 2007/0283138 A1* | 12/2007 | Miga et al. .................. 713/2 |
| 2007/0300050 A1* | 12/2007 | Zimmer .............. G06F 8/65 713/1 |
| 2008/0077993 A1* | 3/2008 | Zimmer ........... G06F 9/5077 726/27 |
| 2008/0155331 A1* | 6/2008 | Rothman ......... G06F 11/1417 714/36 |
| 2009/0070768 A1* | 3/2009 | Choudhury et al. .......... 718/104 |
| 2009/0249055 A1* | 10/2009 | Itoh ............................ 713/2 |
| 2009/0300370 A1* | 12/2009 | Yao .................. G06F 12/145 713/193 |
| 2010/0169633 A1* | 7/2010 | Zimmer ............. G06F 21/575 713/2 |
| 2010/0169949 A1* | 7/2010 | Rothman ............ G06F 21/35 726/1 |
| 2011/0138166 A1* | 6/2011 | Peszek ............. G06F 21/575 713/2 |
| 2012/0239918 A1* | 9/2012 | Huang ......................... 713/2 |

OTHER PUBLICATIONS 2.2.2 Runtime Services, 4.5 EFI Runtime Services Table, 4.6 EFI Configuration Table, and 7.2 Variable Services, Unified Extensible Firmware Interface Specification Version 2.3.1, Apr. 6, 2011, pp. 21-22, pp. 84-86, pp. 86-87, pp. 213-222, Unified EFI, Inc.

* cited by examiner

| CS | DS | ES | FS |
| --- | --- | --- | --- |
| GS | SS | EAX | EBX |
| ECX | EDX | ESI | EDI |
| ESP | EBP | EIP | EFLAGS |

FIG. 3

| CS | DS | ES | FS |
| --- | --- | --- | --- |
| GS | SS | EAX | EBX |
| ECX | EDX | ESI | EDI |
| ESP | EBP | EIP | EFLAGS |
| Buffer | | | |

FIG. 4

METHOD OF OBTAINING INSTRUCTION FOR TRIGGERING FUNCTION

CROSS-REFERENCE TO RELATED APPLICATION

This application claims the priority benefit of Taiwan application serial no. 101107034, filed on Mar. 2, 2012. The entirety of the above-mentioned patent application is hereby incorporated by reference herein and made a part of this specification.

BACKGROUND OF THE INVENTION

1. Field of the Invention

The invention generally relates to a method of controlling a computer system to execute a specific function, and more particularly, to a method of obtaining an instruction to control a computer system to execute a specific function.

2. Description of Related Art

Generally speaking, various tests and value settings are performed on a computer system by its manufacturer before the computer system is shipped. To be specific, a test/setting tool is adopted to issue INT 15 interrupt instructions or instructions conforming to Windows Management Instrumentation (WMI) of Microsoft Corporation, and the basic input/output system (BIOS) is called to execute specific tasks (for example, setting product serial number or loading predetermined boot order) according to current register settings by issuing system management interrupt (SMI) instructions.

However, the new-generation processors do not support SMI anymore. Accordingly, a computer system having such a processor cannot use the original test/setting tool. In other words, if a computer system does not support SMI, a test/setting tool cannot call the BIOS to execute specific tasks by issuing SMIs. Thereby, another mechanism for replacing the SMI technique is required to allow the tests or basic settings before a computer system is shipped to be successfully accomplished.

SUMMARY OF THE INVENTION

Accordingly, the invention is directed to a method of obtaining a function, triggering instruction. The present method allows a basic input/output system (BIOS) of a computer system which does not support system management interrupt (SMI) to obtain an interrupt instruction and execute a function triggered by the interrupt instruction.

The invention provides a method of obtaining an instruction for triggering a function. The method is adapted to a computer system using a unified extensible firmware interface (UEFI). In the present method, a variable in a read-only memory (ROM) of a BIOS is accessed during a power-on self test (POST) of the computer system, wherein the variable includes a first element, a second element, and a third element. Whether values of the first element and the second element respectively match a variable name and a globally unique identifier (GUID) corresponding to the instruction is determined. If the values of the first element and the second element respectively match the variable name and the GUID corresponding to the instruction, the function triggered by the instruction is executed according to a value of the third element.

According to an embodiment of the invention, before the step of accessing the variable during the POST of the computer system, the method further includes following steps. A memory space in the ROM of the BIOS is allocated to the variable, and the values of the first element, the second element, and the third element of the variable are respectively set through a runtime service of the UEFI.

According to an embodiment of the invention, the third element includes a plurality of register fields, and a correspondence exists between the register fields and a plurality of registers of a central processing unit (CPU) of the computer system. The step of respectively setting the values of the first element, the second element, and the third element of the variable through the runtime service further includes following steps. When the values of the first element and the second element are set as the variable name and the GUID corresponding to the instruction, at least one register value required by the function triggered by the instruction is obtained, wherein each register value is corresponding to one of the registers. Each register value is written into one of the register fields according to the correspondence.

According to an embodiment of the invention, after the step of writing each register value into one of the register fields according to the correspondence, the method further includes following step. After confirming that the values of the first element and the second element are set as the variable name and the GUID corresponding to the instruction, the computer system is automatically re-started.

According to an embodiment of the invention, the step of executing the function triggered by the instruction according to the value of the third element includes following steps. One or more non-blank register fields containing register values are obtained among the register fields of the third element. The function is identified according to the one or more non-blank register fields and the register values thereof. The function is executed by using the BIOS.

According to an embodiment of the invention, the third element further includes a context field, and the step of respectively setting the values of the first element, the second element, and the third element of the variable through the runtime service further includes following steps. When the values of the first element and the second element are set as the variable name and the GUID corresponding to the instruction, a setting data required by the function triggered by the instruction is obtained, and the setting data is written into the context field.

According to an embodiment of the invention, the step of executing the function triggered by the instruction according to the value of the third element further includes following steps. One or more non-blank register fields containing register values are obtained among the register fields of the third element. The function is identified according to the one or more non-blank register fields and the register values thereof. The function is executed according to the setting data by using the BIOS.

According to an embodiment of the invention, the instruction is an interrupt instruction, and the function includes setting a product serial number, loading predetermined system values, setting/clearing a boot password, setting a product name, setting a boot order, and setting a manufacturer logo.

According to an embodiment of the invention, after the step of determining whether the values of the first element and the second element respectively match the variable name and the GUID corresponding to the instruction, the method further includes following step. If the value of the first element or the value of the second element does not match the variable name or the GUID corresponding to the instruction, the POST is continued.

According to an embodiment of the invention, the computer system does not support system management interrupt (SMI).

As described above, in the invention, specific variable name and GUID are set up regarding a variable in the ROM of the BIOS, and the variable is then considered as a special instruction. Thereby, a computer system can read the variable to identify the instruction and execute a function triggered by the instruction when the computer system boots up.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a diagram illustrating the format of a third element of a variable according to an embodiment of the invention.

FIG. 4 is a diagram illustrating the format of a third element of a variable according to another embodiment of the invention.

DESCRIPTION OF THE EMBODIMENTS

Figure 1:
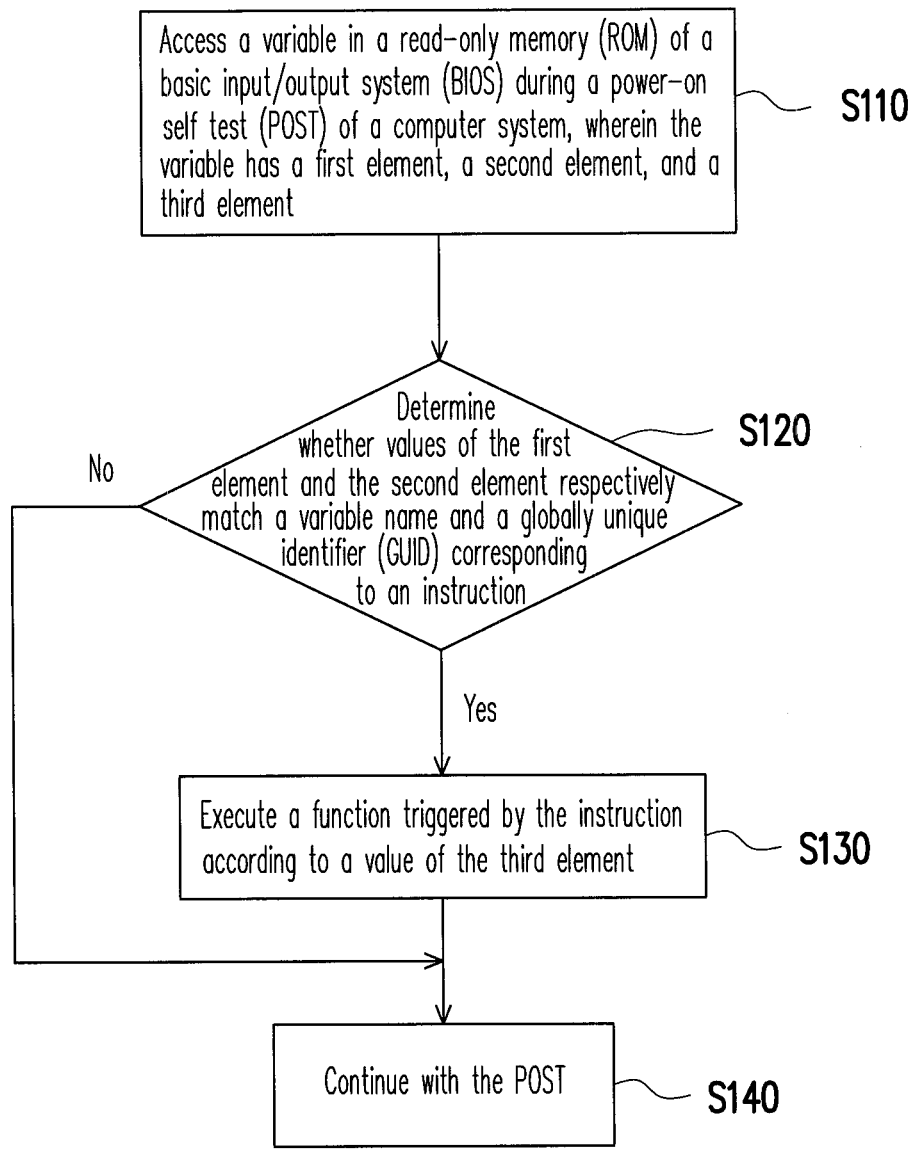
FIG. 1 is a flowchart of a method of obtaining a function triggering instruction according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart of a method of obtaining a function triggering instruction according to an embodiment of the invention. The method in the present embodiment is adapted to a computer system using a unified extensible firmware interface (UEFI). Herein the UEFI is an interface specification between the operating system (OS) and firmware of the computer system. The computer system may be a desktop computer system, a notebook computer system, a workstation, or a server. However, the type of the computer system is not limited in the invention. To be specific, the computer system in the present embodiment does not support system management interrupt (SMI) therefore cannot call the basic input/output system (BIOS) thereof to execute specific tasks by issuing SMI instructions. Below, how the BIOS of a computer system using a UEFI obtains an instruction and executes a corresponding function will be explained with reference to FIG. 1.

First, in step S110, during the power-on self test (POST) of the computer system, the BIOS accesses a variable in a read-only memory (ROM) of the BIOS, wherein the variable has a first element, a second element, and a third element. The data type of the first element is string, and the first element is used for recording the name of the variable. The data type of the second element is uniqueidentifier, and the second element is used for recording a string composed of 32 hexadecimal characters (i.e., digits 0 to 9 and letters A to H). The third element can be considered as a data buffer, and which is used for recording the content of the variable. In other embodiments, the variable may further have elements for recording variable attributes and the size of the data buffer. To be specific, the BIOS of the computer system can read the variable through a runtime service of the UEFI during the POST. For example, the BIOS can call a function GetVariable to read values of various elements of the variable in the BIOS ROM. The function prototype of the function GetVariable may be:

```
typedef
EFI_STATUS
GetVariable(
  IN      CHAR16     *VariableName,
  IN      EFI_GUID   *VendorGuid,
  OUT     UINT32     *Attributes,
  IN OUT UINTN       *DataSize,
  OUT     VOID       *Data
);
```

The parameter "VariableName" of the function GetVariable returns the value of the first element of the variable. The parameter "VendorGuid" of the function GetVariable returns the value of the second element of the variable. The parameter "Data" of the function GetVariable returns the value of the third element of the variable. When the variable has the elements for recording attributes and the size of data buffer, the values of these two elements can be obtained through the parameters "Attributes" and "DataSize" of the function GetVariable.

Then, in step S120, the BIOS determines whether the values of the first element and the second element of the variable respectively match a variable name and a globally unique identifier (GUID) corresponding to an instruction. In the present embodiment, the instruction may be an interrupt instruction (for example, an INT 15 interrupt instruction) or an instruction conforming to Windows Management Instrumentation (WMI) of Microsoft Corporation. However, the type of the instruction is not limited in the invention, and in other embodiments, the instruction may also be any instruction which calls the BIOS through SMI. For example, the computer system records a correspondence table, the correspondence table contains variable names and GUIDs corresponding to different special instructions, and the BIOS determines whether the values of the first element and the second element of the variable match the variable name and the GUID corresponding to any special instruction by looking up the correspondence table.

If the BIOS determines in step S120 that the values of the first element and the second element do not match the variable name and the GUID corresponding to any instruction, the variable is determined to be a general variable, and in step S140, the POST is continued to complete the boot-up procedure of the computer system.

If the BIOS determines in step S120 that the values of the first element and the second element match the variable name and the GUID corresponding to an instruction, the variable is determined to represent a special instruction, and to the BIOS, reading the variable is equivalent to receiving the instruction. Thus, in step S130, the BIOS executes a function triggered by the instruction according to the value of the third element of the variable. The function triggered by the instruction may be setting a product serial number, loading predetermined system values, setting/clearing a boot password, setting a product name, setting a boot order, or setting a manufacturer logo. However, the invention is not limited thereto. After the function is completed, as in step S140, the POST is continued to complete the boot-up procedure.

As shown in FIG. 1, if specific variable name and GUID are written into the variable in the ROM of the BIOS, the variable is not a general variable simply used for recording data. Instead, the variable represents an instruction for triggering a specific function. Accordingly, during the boot-up procedure of the computer system, it is considered that the BIOS receives the instruction when the BIOS reads the variable from its ROM. Thus, the BIOS executes the corresponding function according to the content of the variable. In other words, even though the BIOS cannot be called through SMI, it can execute the function triggered by the instruction by reading the variable.

Figure 2:
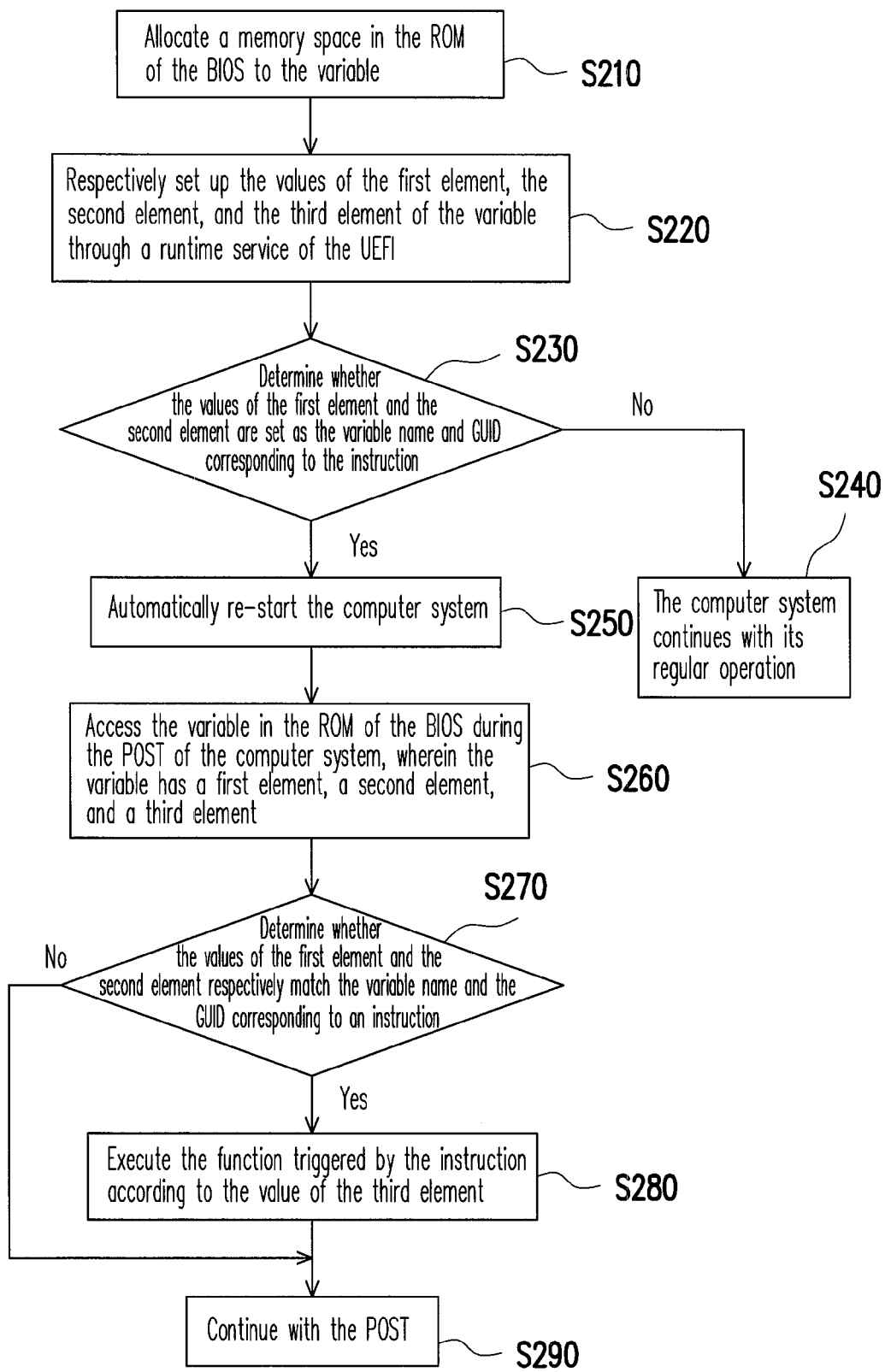
FIG. 2 is a flowchart of a method of obtaining a function triggering instruction according to another embodiment of the invention.

FIG. 2 is a flowchart of a method of obtaining a function triggering instruction according to another embodiment of the invention. Below, how the variable is set and how to identify the function triggered by an instruction will be further explained with reference to FIG. 2.

First, in step S210, a memory space in the ROM of the BIOS is allocated to a variable. Namely, all setting values of the variable are stored into the allocated memory space. Because ROM is non-volatile memory, data in the computer system won't be lost even if the computer system is powered off and turned on again. In the present embodiment, the variable has a first element, a second element, and a third element. The third element includes a plurality of register fields, and a one-to-one correspondence exists between the register fields and all the registers of the central processing unit (CPU) of the computer system. For example, assuming that the CPU of the computer system is an Intel CPU, the third element has 16 register fields respectively corresponding to the 16 registers (for example, registers CS, DS, ES, FS GS, SS, EAX, EBX, ECX, EDX, ESI, EDI, ESP, EBP, EIP, and EFLAGS) of the Intel CPU. The sequence of aforementioned 16 register fields is shown in FIG. 3. However, the invention is not limited thereto. Referring to FIG. 3, in the present embodiment, each register field is marked with the name of the corresponding register, and the length of each register field may be 4 bytes.

Next, in step S220, a specific application program in the OS of the computer system calls a runtime service of the UEFI, so as to respectively set up the values of the first element, the second element, and the third element of the variable through this runtime service. To be specific, the specific application program can call a function SetVariable to set the value of each element. The function prototype of the function SetVariable may be:

```
typedef
EFI_STATUS
SetVariable (
    IN CHAR16       *VariableName,
    IN EFI_GUID     *VendorGuid,
    IN UINT32       Attributes,
    IN UINTN        DataSize,
    IN VOID         *Data
);
```

If the specific application program is about to use the variable to represent an instruction for triggering a specific function, it respectively assigns the variable name and the GUID corresponding to the instruction to the first element and the second element of the variable by using the parameters "VariableName" and "VendorGuid" of the function SetVariable. The variable name may be the string "SpecificAPI", and the GUID may be "21EC2020-3AEA-1069-A2DD-08002B30309D". However, foregoing variable name and GUID are only an example and the invention is not limited thereto.

Different registers and register values thereof are configured with different function triggered by the instruction. Accordingly, the specific application program obtains the registers and the corresponding register values required by the function to be triggered and writes the register values into the corresponding register fields of the third element of the variable by using the parameter "Data" of the function SetVariable according to the correspondence between the register fields and the registers. For example, herein it is assumed that the specific application program is about to set the variable as an instruction for triggering a function of loading predetermined system values and this function requires the registers EAX and EBX to be configured. If the third element of the variable has a format as shown in FIG. 3, the specific application program respectively writes the desired register values into the register fields corresponding to the registers EAX and EBX through the parameter "Data" of the function SetVariable and writes a predetermined initial register value into the other register fields. For example, the specific application program writes the register value 0x1234 into the register field corresponding to the register EAX, writes the register value 0x1111 into the register field corresponding to the register EBX, and writes the predetermined initial register value 0x0000 into the register fields corresponding to the other registers.

Next, in step S230, whether the values of the first element and the second element are set as the variable name and GUID corresponding to the instruction is determined. If it is determined in step S230 that the values of the first element and the second element are not set as the variable name and GUID corresponding to the instruction, which means the specific application program simply writes the value of a general variable through the runtime service of the UEFI, in step S240, the computer system continues with its regular operation.

However, if it is determined in step S230 that the values of the first element and the second element are set as the variable name and GUID corresponding to the instruction, it means that the variable represents a special instruction. In order to allow the BIOS to receive the instruction by reading the variable, in next step S250, the computer system is automatically re-started. Besides, in step S260, the BIOS accesses the variable in the ROM of the BIOS during the POST of the computer system, and in step S270, the BIOS determines whether the values of the first element and the second element of the variable respectively match a variable name and a GUID corresponding to an instruction. Steps S260 and S270 are the same as or similar to steps S110 and S120 in FIG. 1 therefore will not be further described herein.

If the BIOS determines in step S270 that the values of the first element and the second element of the variable do not match the variable name and GUID corresponding to an instruction (which means the variable read by the BIOS does not represent any special instruction), in step S290, the POST is continued to complete the boot-up procedure of the computer system.

If the BIOS determines in step S270 that the values of the first element and the second element of the variable match the variable name and GUID corresponding to an instruction, in next step S280, the BIOS executes the function triggered by the instruction according to the value of the third element of the variable. To be specific, the BIOS obtains all non-blank register fields containing register values among all the register fields of the third element, then identifies the function to be triggered according to all the non-blank register fields and the register values thereof, and eventually executes the function. As in the embodiment described above, assuming that the two non-blank register fields obtained by the BIOS are respectively corresponding to the registers EAX and EBX and the register values written into these two non-blank register fields are respectively 0x1234 and 0x1111, the BIOS identifies and executes the function of loading predetermined system values. In the last step S290, the POST is continued after the function is executed to complete the boot-up procedure of the computer system.

Regarding any function (for example, setting a product serial number, loading predetermined system values, setting/clearing a boot password, and setting a product name) that is originally executed by the BIOS through SMI and is controlled by simply setting the register values, the steps illustrated in FIG. 2 and the variable structure illustrated in FIG. 3 can be adopted so that a specific application program in the OS can call a runtime service (for example, the function SetVariable) of the UEFI to write the variable name, GUID, and register values of the corresponding instruction and function into corresponding elements of the variable. Accordingly, when the computer system is re-started, the BIOS can read the content of the variable through another runtime service (for example, the function GetVariable) and, after identifying that the content of the variable is corresponding to specific instruction and function, executes the function in the computer system.

In another embodiment, it is assumed that the CPU of the computer system is an Intel CPU, and the format of the third element of the variable is as shown in FIG. 4. Referring to FIG. 4, besides 16 register fields (respectively corresponding to the registers CS, DS, ES, FS GS, SS, EAX, EBX, ECX, EDX, ESI, EDI, ESP, EBP, EIP, and EFLAGS), the third element further has a context field following the 16 register fields. In the present embodiment, the length of each register field is 4 bytes, and the length of the context field is not limited.

Moreover, if the computer system is about to execute a function which comes with specific setting data and is originally executed by the BIOS through SMI (for example, the function of setting a boot order requires the boot order as the setting data, and the function of setting a manufacturer logo requires a logo file as the setting data), a specific application program in the OS can call a runtime service (for example, the function SetVariable) of the UEFI to write the variable name, GUID, register values, and setting data of corresponding special instruction and function respectively into corresponding register fields of the first element, the second element, and the third element of the variable and the context field of the third element. Herein the register values and the setting data can be obtained through table lookup or user input. However, how the register values and the setting data are obtained is not limited in the invention.

Thereafter, when the computer system is re-started and executes POST, the BIOS reads the variable through a runtime service (for example, the function GetVariable) of UEFI. If the BIOS determines that the variable represents a special instruction according to the values of the first element and the second element of the variable, the BIOS further executes the function according to non-blank register fields containing register values in the third element and the setting data recorded in the context field of the third element.

For example, if a variable name and a GUID corresponding to an interrupt instruction are recorded in the first element and the second element of a variable read by the BIOS and the register values of the non-blank register fields in the third element of the variable are corresponding to the function of setting boot order, the BIOS updates the boot order of the computer system according to the setting data recorded in the context field of the third element. Or, if the register values of the non-blank register fields in the third element of the variable are corresponding to the function of setting a manufacturer logo, the BIOS updates or configures the manufacturer logo according to the setting data recorded in the context field of the third element.

As described above, the invention provides a method of obtaining an instruction for triggering a function. In the present method, a UEFI runtime service is called to write information corresponding to a specific instruction and a function triggered by the instruction into a variable in a ROM of a BIOS. Thereby, when next time the computer system is started, the BIOS can execute the corresponding function by determining whether the value of the variable is corresponding to the specific instruction. In other words, the variable is not used simply for storing data. Instead, it is considered an instruction for triggering a special function when a specific value is written into the variable. The method of obtaining a function triggering instruction provided by the invention can be used in test or initial setting of a computer system after the computer system is just manufactured, so that even if the computer system does not support SMI, the BIOS can automatically execute a function triggered by an INT 15 interrupt instruction or an instruction conforming to WMI.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of obtaining an instruction for triggering a function, adapted to a computer system using a unified extensible firmware interface (UEFI), the method comprising:

accessing a variable in a read-only memory (ROM) of a basic input/output system (BIOS) during a power-on self test (POST) of the computer system, wherein the variable comprises a first element, a second element, and a third element;

determining whether values of the first element and the second element respectively match a variable name and a globally unique identifier (GUID) corresponding to the instruction;

when the values of the first element and the second element respectively match the variable name and the GUID corresponding to the instruction, executing the function triggered by the instruction according to a value of the third element; and respectively setting the values of the first element, the second element, and the third element of the variable through a runtime service of the UEFI before accessing the variable during the POST of the computer system, wherein the third element comprises a plurality of register fields, a correspondence exists between the register fields and a plurality of registers of a central processing unit (CPU) of the computer system, and the step of respectively setting the values of the first element, the second element, and the third element of the variable through the runtime service comprises:

when the values of the first element and the second element are set as the variable name and the GUID corresponding to the instruction, obtaining at least one register value required by the function triggered by the instruction, wherein each of the at least one register value is corresponding to one of the registers; and writing each of the at least one register value into one of the register fields according to the correspondence.

2. The method according to claim 1, wherein before the step of accessing the variable during the POST of the computer system, the method further comprises:

allocating a memory space in the ROM of the BIOS to the variable.

3. The method according to claim 1, wherein after the step of writing each of the at least one register value into one of the register fields according to the correspondence, the method further comprises:

after confirming that the values of the first element and the second element are set as the variable name and the GUID corresponding to the instruction, automatically re-starting the computer system.

4. The method according to claim 3, wherein the step of executing the function triggered by the instruction according to the value of the third element comprises:

obtaining at least one non-blank register field containing register value among the register fields of the third element;

identifying the function according to the at least one non-blank register field and the register value of the at least one non-blank register field; and executing the function by using the BIOS.

5. The method according to claim 4, wherein the instruction is an interrupt instruction, and the function comprises setting a product serial number, loading predetermined system values, setting/clearing a boot password, and setting a product name.

6. The method according to claim 4, wherein after the step of determining whether the values of the first element and the second element respectively match the variable name and the GUID corresponding to the instruction, the method further comprises:

when the value of the first element or the value of the second element does not match the variable name or the GUID corresponding to the instruction, continuing with the POST.

7. The method according to claim 3, wherein the third element further comprises a context field, and the step of respectively setting the values of the first element, the second element, and the third element of the variable through the runtime service further comprises:

when the values of the first element and the second element are set as the variable name and the GUID corresponding to the instruction, obtaining a setting data required by the function triggered by the instruction; and writing the setting data into the context field.

8. The method according to claim 7, wherein the step of executing the function triggered by the instruction according to the value of the third element comprises:

obtaining at least one non-blank register field containing register value among the register fields of the third element;

identifying the function according to the at least one non-blank register field and the register value of the at least one non-blank register field; and executing the function according to the setting data by using the BIOS.

9. The method according to claim 8, wherein the instruction is an interrupt instruction, and the function comprises setting a boot order and setting a manufacturer logo.

10. The method according to claim 8, wherein after the step of determining whether the values of the first element and the second element respectively match the variable name and the GUID corresponding to the instruction, the method further comprises:

when the value of the first element or the value of the second element does not match the variable name or the GUID corresponding to the instruction, continuing with the POST.

11. The method according to claim 1, wherein the computer system does not support system management interrupt (SMI).

* * * * *